(12) United States Patent
Raghavachari et al.

(10) Patent No.: US 7,036,008 B2
(45) Date of Patent: Apr. 25, 2006

(54) AUTONOMIC DETERMINATION OF CONFIGURATION SETTINGS BY WALKING THE CONFIGURATION SPACE

(75) Inventors: Mukund Raghavachari, Baldwin Place, NY (US); Robert D. Johnson, Ridgefield, CT (US); Darrell Christopher Reimer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 10/417,994

(22) Filed: Apr. 17, 2003

(65) Prior Publication Data

US 2004/0210884 A1 Oct. 21, 2004

(51) Int. Cl.
*G06F 9/00* (2006.01)
*G06F 9/24* (2006.01)
*G06F 15/177* (2006.01)

(52) U.S. Cl. .............................. 713/1; 713/2; 713/100; 709/202; 709/203

(58) Field of Classification Search .................... 713/1, 713/2, 100; 709/200–203, 220–221; 717/127–133
See application file for complete search history.

(56) References Cited

U.S. PATENT DOCUMENTS

| | | | | |
|---|---|---|---|---|
| 5,371,892 A | * | 12/1994 | Petersen et al. | 713/1 |
| 5,504,904 A | * | 4/1996 | Dayan et al. | 713/1 |
| 5,619,701 A | * | 4/1997 | Neti | 718/104 |
| 5,819,030 A | * | 10/1998 | Chen et al. | 709/220 |
| 6,363,517 B1 | * | 3/2002 | Levi et al. | 716/6 |
| 6,363,519 B1 | * | 3/2002 | Levi et al. | 716/16 |
| 6,601,175 B1 | * | 7/2003 | Arnold et al. | 726/7 |
| 2003/0093501 A1 | * | 5/2003 | Carlson et al. | 709/220 |
| 2003/0135609 A1 | * | 7/2003 | Carlson et al. | 709/224 |

OTHER PUBLICATIONS

Disclosure Title: Optimization of Computer Configurations. Publication-Data: IBM Technical Disclosure Bulletin, Dec. 1975, US vol. No.: 18 Issue No.: 7 p. No.: 2235-2238.*

* cited by examiner

*Primary Examiner*—Majid Banankhah
(74) *Attorney, Agent, or Firm*—Michael J. Buchenhorner; Casey P. August (57) ABSTRACT

A method for setting configuration parameters for at least one software system, comprises the steps of: a) receiving an identification of a set of configuration parameters for at least one software system to be optimized; b) selecting a random value from a predetermined range for each configuration parameter of interest; c) setting each configuration parameter to a corresponding random value selected; d) running an application using the values selected; e) gathering performance information relating to the software system while the application is running; f) repeating steps b) through e) for a selected number of times; and g) performing an analysis of the performance information gathered to determine optimal configuration parameters. The method can be performed by a programmable computer system running program instructions for carrying out the above method steps or by a specialized apparatus such as an ASIC.

20 Claims, 7 Drawing Sheets

Data Source Connection Pool Max – EJB Containers Thread Pool

AUTONOMIC DETERMINATION OF CONFIGURATION SETTINGS BY WALKING THE CONFIGURATION SPACE

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

None.

FIELD OF THE INVENTION

The invention disclosed broadly relates to the field of software systems and more particularly relates to determining the optimal configuration settings for a software system.

BACKGROUND OF THE INVENTION

The development of large-scale business applications today must address a variety of concerns. Among these concerns are concurrency management, transaction management, persistence, security, presentation, business logic. All of these concerns must be addressed within the framework of applications, hardware/software topologies, and workloads. Each software component within this framework may have several configuration parameters that must be set correctly for the system to work properly. An incorrect configuration can result in application failure or underperformance, both of which are costly to organizations.

Frameworks such as Java™ 2 Platform, Enterprise Edition (J2EE™) developed by Sun Microsystems are designed to simplify the process of configuring a system by supporting the separation of concerns. The application developer can, for the most part, focus on implementing the business logic aspect of an application; the application server on which the application is deployed handles much of the complexity of concurrency, transaction, and persistence management.

In this framework, the deployer, the individual who configures the application server to manage concurrency, transaction and persistence correctly and efficiently, plays a central role. Enterprise systems are quite complex and the deployer in charge of configuring such a system must deal with the following: 1) the interactions between the application itself and the data affect the configuration of the application server and the deployer is usually not supplied with sufficient documentation to deal with this; 2) hardware and software systems with which the application interacts can affect its deployment significantly; 3) the workload of the application can affect the configuration of the application server; 4) best practice guides and rule-based profiles are heuristics that cannot possibly cover the entire space of applications, hardware/software topologies, and workloads and they themselves may have been based on a faulty premise; and 5) configuration-based problems are often difficult and expensive to trace because, more often than not, when an application fails the assumption is made that the application itself is flawed and resources are expended to find the culprit, which is thought to be a program bug.

The sheer size and complexity of the configuration space make it very difficult to manage. This situation is further complicated when, as is usually the case, the deployer who sets the configuration is the not the same person who designed the system and is not a user of the system. More often than not, the deployer is configuring a legacy system. Without adequate tools at their disposal, deployers must configure application servers using a mixture of rule-of-thumb, intuition, and trial-and-error. For smaller systems, control theory offers an adequate method for determining configuration values through appropriate models of the software, but for large system topologies seen in practice, such as enterprise systems, it is difficult to derive an appropriate model of the system. Even if a model could be developed it is highly unlikely that the model would be extensible across other application deployments, therefore there is a need for a methodology for configuring large systems.

Figure 1:
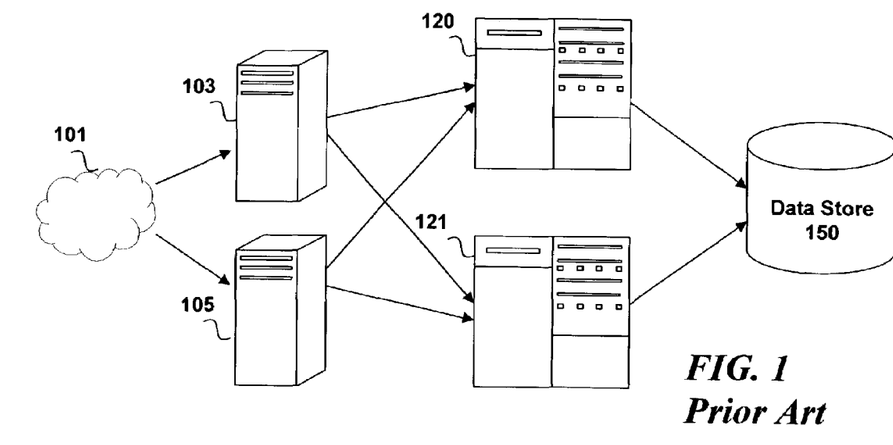
FIG. 1 is an illustration of a conventional topology of an application server deployment, according to the prior art.

Referring to FIG. 1, there is shown a block diagram of a conventional topology for application server deployment, according to the prior art. The Web servers 103 and 105 direct requests from the Internet 101 to the application servers 120 and 121. The application servers 120 and 121 are connected to a back-end database 150 where enterprise data are persisted.

Figure 2:
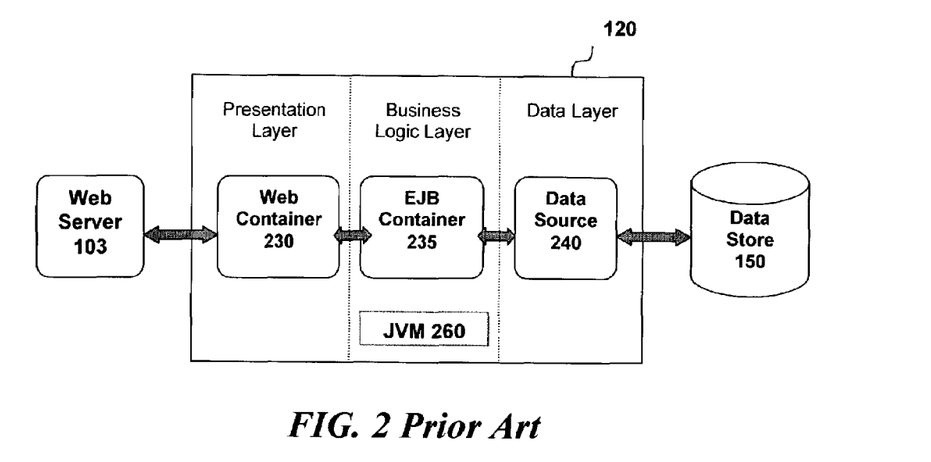
FIG. 2 shows a representation of the structure of a J2EE-based application server, according to the prior art.

Referring to FIG. 2, there is shown a block diagram of the structure of a J2EE-based application server, according to the known art. The application server 120 for this system is generally written in Java, and therefore, the entire system executes in one or more Java Virtual Machines (JVM) 260. As stated earlier, J2EE supports the separation of concerns; therefore the application server 120 is partitioned with respect to presentation, business logic, and data layers. The Web container 230 corresponds to the presentation layer. It manages interactions with the Web server 103. Browser requests are routed through the Web server 103 to the Web container 230, where either a static HTML page is returned or the execution of a Java Server Page (JSP) or servlet is launched. The JSP or servlet may in turn interact with the business logic layer, and ultimately, synthesizes the HTML returned to the user. The Web container 230 determines the concurrency of the servlets by controlling how many threads may execute at a time.

The Enterprise JavaBeans (EJB) container 235 corresponds to the business logic layer. The EJB container 235 manages the creation and execution of the Enterprise Java Beans deployed on the server 120. Furthermore, it controls the transactional behavior of the EJBs, their concurrency, and their caching. It also controls the interactions of the EJBs with the data source 240, which corresponds to the data layer. A data source 240 is an abstraction of a database. IT departments manage connections to a database 150 in a connection pool to reduce the expense involved in creating new connections. When an EJB no longer requires a connection to a database, rather than closing the connection, it returns the connection to the pool for later reuse. Furthermore, the data source 240 maintains a statement cache that is used to reduce the cost of processing frequently executed Structured Query Language (SQL) requests.

SUMMARY OF THE INVENTION

Briefly, according to a claimed invention, a method for setting configuration parameters for at least one software system, comprises the steps of: a) receiving an identification of a set of configuration parameters for at least one software system to be optimized; b) selecting a random value from a predetermined range for each configuration parameter of interest; c) setting each configuration parameter to a corresponding random value selected; d) running an application using the values selected; e) gathering performance information relating to the software system while the application is running; f) repeating steps b) through e) for a selected number of times; and g) performing an analysis of the performance information gathered to determine optimal configuration parameters. The method can be performed by a programmable computer system running program instructions for carrying out the above method steps or by a specialized apparatus such as an ASIC (application-specific integrated circuit).

DESCRIPTION OF THE PREFERRED EMBODIMENT

We describe a low-cost methodology to address the problem of determining the correct configuration for a software system, such as an application server, or a set of interconnected software systems, such as a system comprising an application server, a JVM, a database, and a Web server as shown in FIG. 2. The method can be used on a wide variety of software systems because it works by autonomically exploring the configuration space of an application and then analyzing the results of that exploration to determine the optimal configuration. It is especially beneficial when used to determine a configuration for an enterprise system, where there is currently no suitable methodology. System configuration parameters pertaining to a given system are chosen randomly from within a reasonable range of values and then a workload is run on the system set with the selected parameters. The results of each test run are recorded for subsequent analysis.

In order to rule out problems with the application itself, the application should first be run multiple times with a given configuration to ascertain that the application behaves deterministically with respect to the configuration. This means that application outcomes are directly related to the configuration and are not affected by outside factors such as a bug in the application, or a network problem. The application should be run a sufficient number of times with the same configuration to satisfy one knowledgeable with the system that it is bug-free and to allow for and eliminate factors outside of the tests itself which could affect the results. Assume that fifteen times is a suitable number of runs for this preliminary step. The application must behave somewhat consistently, that is, not exhibit wide swings in performance for a given configuration. Minor variations in system performance are to be expected, and can be tolerated as long as they fall within an acceptable range. The range can be a minimum to a maximum standard deviation/mean value, as determined by someone with knowledge of the system. When applications satisfy this requirement, changes in performance across runs can be attributed to the effects of changes in configuration values.

Figure 3:
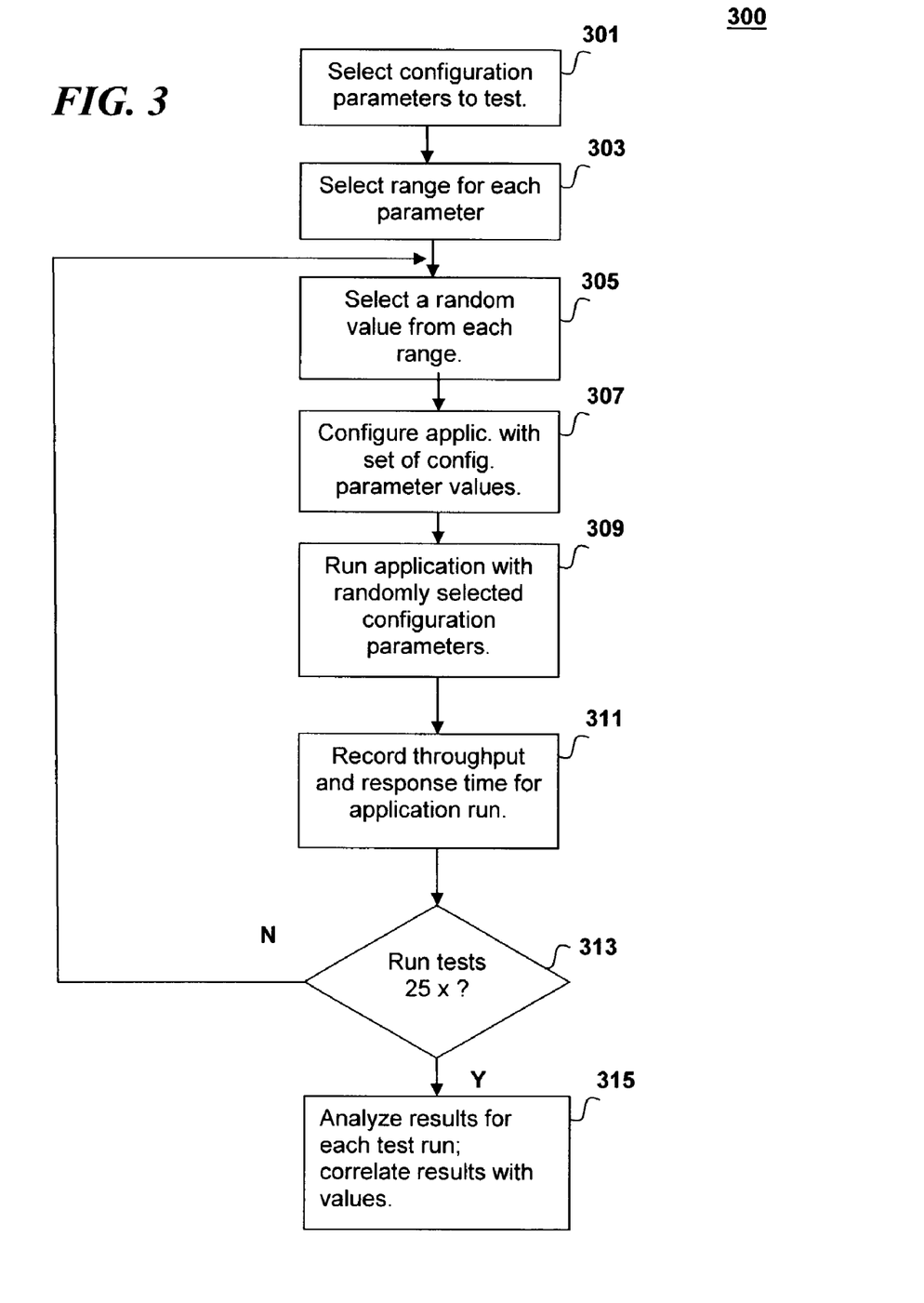
FIG. 3 is a flow chart illustrating a method according to the invention.

Referring to FIG. 3 there is shown a flow diagram of the process of determining the optimal configuration settings for an application server, according to an embodiment of the invention. The process begins at step 301 by selecting a set of configuration parameters for this system which are believed to affect the performance of the given system. The parameters chosen depend on many factors, such as: the system itself; the applications which run on the system; the hardware and software systems with which the application interacts; network characteristics; the number of machines in the network; the topology of the network; and the workload of the application. For enterprise systems, a deployer could be dealing with over fifty parameters to set. To illustrate the benefits of this methodology, the following examples present some of the issues involved in configuring an application server while deploying applications within a J2EE framework.

Assume that the problem to solve is the optimal configuration of an application server as shown in FIG. 2. There are many parameters which can affect the performance of such a system, but for purposes of this example, the following nine parameters, shown in Table 1, have been chosen as the most significant:

TABLE 1

| Parameter | Description |
| --- | --- |
| Web Container Thread Pool Minimum | Minimum number of threads in the web container. Represents the minimum amount of concurrency. |
| Web Container Thread Pool Maximum | Maximum number of threads in the web container. Represents the maximum amount of concurrency. |
| Thread is Growable | Denotes whether the web container thread pool maximum number is a hard or soft limit, i.e., whether the thread pool size can be extended if necessary. |
| EJB Container Thread Pool size | Maximum number of threads in the EJB container. |
| Data Source Connection Pool Minimum | Represents the minimum number of connections in the connection pool. |
| Data Source Connection Pool Maximum | Represents the maximum number of connections in the connection pool. |
| Statement Cache | Represents the number of executed SQL statements that are cached. |
| JVM minimum heap size | Minimum amount of memory allocated to the JVM in which the application server (and the applications deployed on it) executes. |
| JVM maximum heap size | Maximum amount of memory allocated to the JVM in which the application server executes. |

The next step 303 involves selecting a range of values for each parameter. The range selected should represent a reasonable range of values for each given parameter as determined by usage, documentation, rules-based profiles, and/or best practice guides. Wherever possible, the range should be broadened to include extreme values at both ends of a continuum. Consistency checks should be performed to ensure that the minimum value is less than the maximum value and that the values chosen are consistent with the hardware and software involved. Assume that the following ranges have been chosen for the nine parameters of Table 1:

TABLE 2

| Parameter | Description |
| --- | --- |
| Web Container Thread Pool Minimum | 10 . . . 35 |
| Web Container Thread Pool Maximum | 35 . . . 100 |
| Thread is Growable | true false |
| EJB Container Thread Pool Size | 5 . . . 50 |
| Data Source Connection Pool Minimum | 5 . . . 25 |
| Data Source Connection Pool Maximum | 15 . . . 40 |
| Statement Cache | 50 . . . 500 |
| JVM minimum heap size | 64 . . . 256 |
| JVM maximum heap size | 256 . . . 768 |

The next step 305 is to randomly select a value from each range for each configuration parameter. The randomly selected values can be selected by the system itself, preferably using a random number generator process. It is important that the selection is a blind selection, that is, that there is no intervention in the number selection. Note that random value selection is not the same as trial-and-error selection. With random selection, there are no pre-conceived expectations of how a given value will affect outcomes, as there is with trial-and-error experimentation. With trial-and-error, a user insinuates pre-conceived expectations of outcomes when selecting a value and then is either proven correct or not when the outcome unfolds. Random value selection is important to this methodology for two reasons: 1) it allows for hands-free, autonomic experimentation with little or no user interaction; and 2) it eliminates prejudicial speculation which taints the experiments and can hamper the selection of an optimal configuration. This latter reason is due to the fact that system documentation and best-practice guides, though helpful, are not always correct. This is because systems today, especially enterprise systems, involve so many interactions (between the application and persistent data, between the application and the hardware/software systems, between the application and the database, etc.) that any available documentation falls short of defining a configuration that takes into account all possible interactions. Deployers must rely on whatever documentation and usage data is available in order to initially set their system configurations. Then, they fine-tune their system configurations based on empirical observations of system performance, not realizing that the original settings may have been flawed. An experiment which highlights this situation will be discussed below.

Next, in step 307, the application is configured with the randomly selected set of configuration parameters. Then, in step 309, the application is run with the parameter values randomly selected. After the application completes, in step 311, the benchmark performance values, such as throughput and response time, are recorded for the application run. Note that throughput and response time are the benchmarks to record in this particular example, but other values could be documented, depending on the system to be examined and the desired goals. The execution speed of the system measured in million instructions per second (MIPS), as a measure of throughput, is another important benchmark value used in the measurement of overall system performance.

Assume that in this example each test is to be run twenty-five times. Any number of reasonable test runs can be used within the spirit and scope of the invention. This number is always flexible and can be changed at any time by the deployer to gain better test data. There are known methods to determine if you have done a statistically significant number of runs.

In step 313 a decision is made to run the application again if the application has not been run the decided-upon number of times with the current parameter values. Then the process loops back to step 305 to choose another set of configuration parameters. It should be kept in mind that each test run includes a new set of randomly-selected parameter values. It is to be understood that some parameter values are selected more than once in an exploration and that some parameter values within a range are not selected at all. Taking for example the parameter "Thread is Growable." The only two possible values for this parameter are "True" or "False." Obviously, these two values are going to be selected multiple times in a twenty-five run test case. By contrast, "Statement Cache" can be set with a value ranging from 50 to 500. Assuming that the values are incremented by a value of ten, it is apparent that 25 runs cannot cover each of the 45 possible choices. It is sufficient, however, that a random selection will cover enough values within the range to yield significant results. If testing determines that this is not the case, the number of runs can be increased.

It should be noted that there are many different types of workloads which could be run against the application. The types of workloads to run include the following: 1) stressing overall throughput vs. maximum system limits (think time vs. no think time); 2) varying loads over time to note response time/throughput levels; and 3) different proportions of different application functionality (mixed workload).

After the workload is run 25 times, in step 315 the recorded results are analyzed. Analysis of the results will indicate if the tests are yielding significant data. This analyzing step itself can be automated. Statistical techniques such as multiple regression can be used to infer useful information from the results of the runs. If the tests are not yielding significant data, the number of runs could be increased, or the tests could be stopped at this point. This method does not guarantee optimal results with every test. Assuming for purposes of this example that twenty-five test runs have yielded some significant results and the results of the test runs have been analyzed statistically, with average response time and throughput correlated with the two most significant configuration parameters, EJB Container Thread Pool Size and Data Source Connection Pool Maximum. Assuming that in this example, it is known to the deployer, based on usage and regression testing, that these two parameters are the most significant contributors to changes in the benchmark values of throughput and average response time. Armed with this information, further analysis will focus on test results correlated with the values of these two parameters, as will be shown in FIGS. 5 and 6.

Although this process can be fully automated and proceed from start to finish with little or no user interaction, in another embodiment of the invention it could be of greater benefit to modify the tests as follows: automate the run of an initial set of tests, and then stop the experiment, analyze the results and then, depending on the findings, narrow the focus of the remainder of the tests. The initial run can highlight certain parameters which require a closer look. In this manner, the parameters singled out by the initial tests as being significant contributors to system performance (either negative or positive), can be tested more exhaustively, rather than testing all parameters equally. This dynamic version of the methodology can result in a faster determination of an optimal configuration by quickly limiting the focus of testing to those values which appear to yield a more significant change in performance. The deployer would have to weigh the benefits of this dynamic version against the additional resources (human and/or data processing) involved in making the intermediate analysis and altering the tests.

Figure 4:
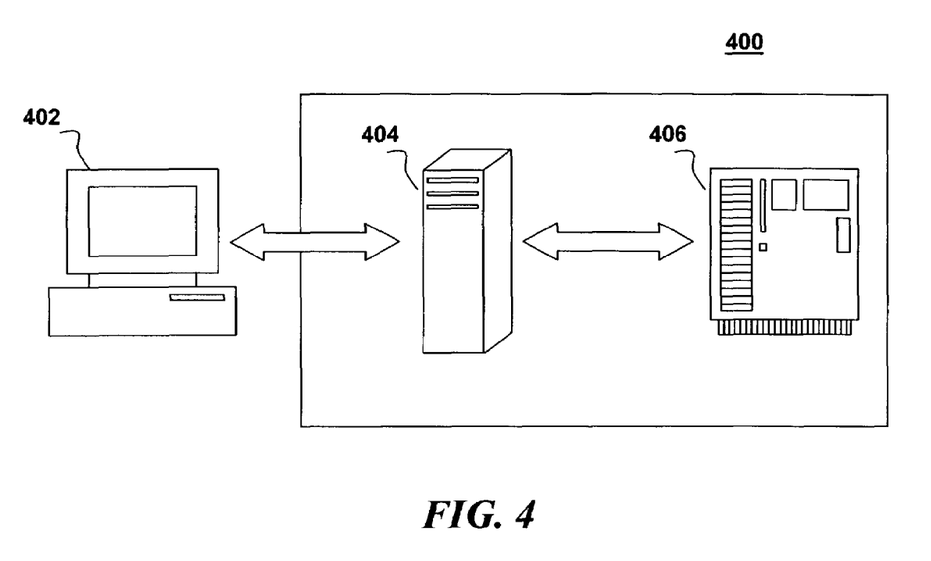
FIG. 4 is a diagram representing the hardware used in the experiments, according to the invention.

Referring to FIG. 4, there is shown a hardware configuration used for testing, according to an embodiment of the invention. In this example, the Web Server (IHS 1.3.19) and the application server (WebSphere 4.03) are run on the same machine, 404. The database, which is a DB2 7.2 fixpack 5 406 is preferably run on a separate machine. The application server 404 and the database 406 in this example are identical machines. The workload driver 402 is represented as a desktop computer system, but can be any suitable information processing machine.

To further illustrate the benefits of this methodology, we examine a case study wherein the configuration space of an application server 404 is explored. This exploration will be conducted as a "black box" test. The entire focus of the example will be on the results of the exploration of the configuration space, therefore certain conditions are assumed, such as the following:

| | |
|---|---|
| Application | manufacturing software application |
| System to configure | application server |
| Hardware | the hardware configuration as shown in FIG. 4 |
| Software | the system as shown in FIG. 2 |
| Parameters tested | see Table 1 |
| Range of values tested | see Table 2 |
| Run-time | approximately 15 minutes |
| Tester | system deployer |
| Values selected by | random number generation |

It is also assumed that the application server has been tested with a given configuration to ascertain that there are no problems inherent with the application itself or the system in which it operates. Assume that running the application with a given configuration fifteen times produced very little variation in the measured throughput. The standard deviation/mean measured is 1.1%, which is satisfactory. Next, the application is run 25 times with varying sets of configuration parameters, chosen from within the range shown in Table 2. The results are shown in FIG. 5.

Figure 5:
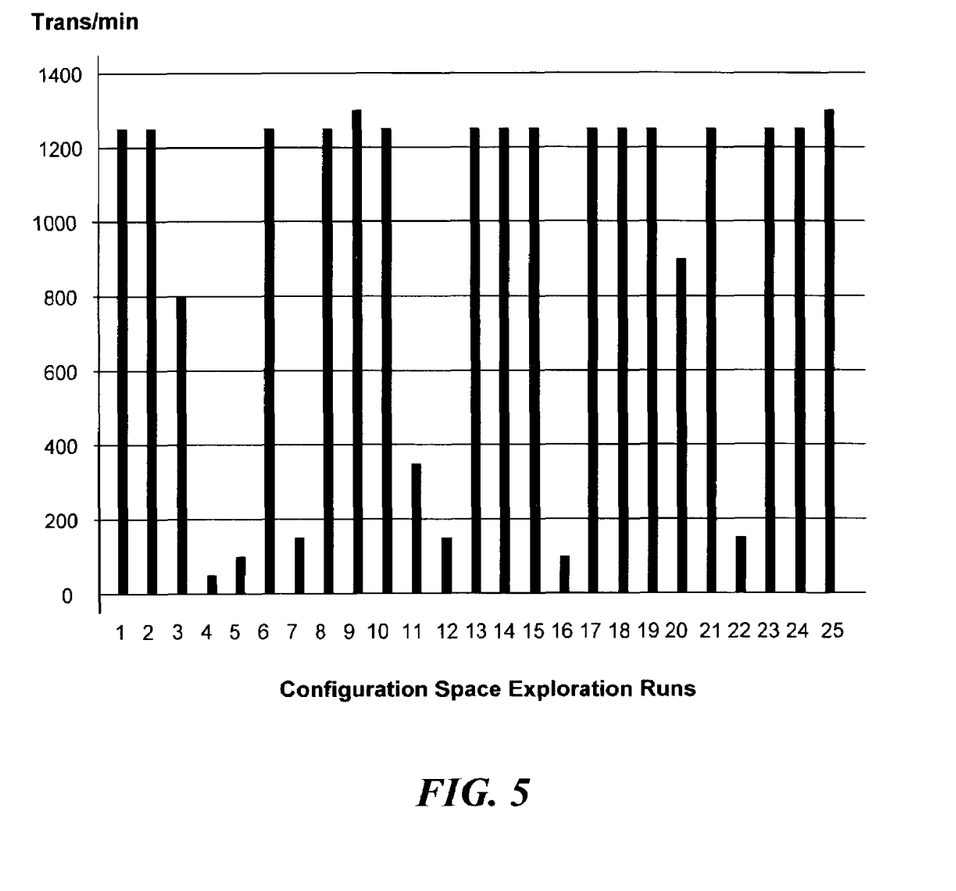
FIG. 5 shows a bar chart representing throughput for each of 25 random configuration space exploration runs.

FIG. 5 shows a bar chart representing 25 runs. The measured throughput (transactions per minute) for each of the 25 random configuration space exploration runs is shown along the vertical axis, numbered from zero to 1400. The configuration space exploration runs are shown on the horizontal axis, numbered from one through twenty-five. The bar chart of FIG. 5 clearly illustrates that the configuration of an application server can have a substantial effect on performance. The maximum throughput (measured at over 1200) is fourteen times greater than the minimum throughput (measured at 90).

Figure 6:
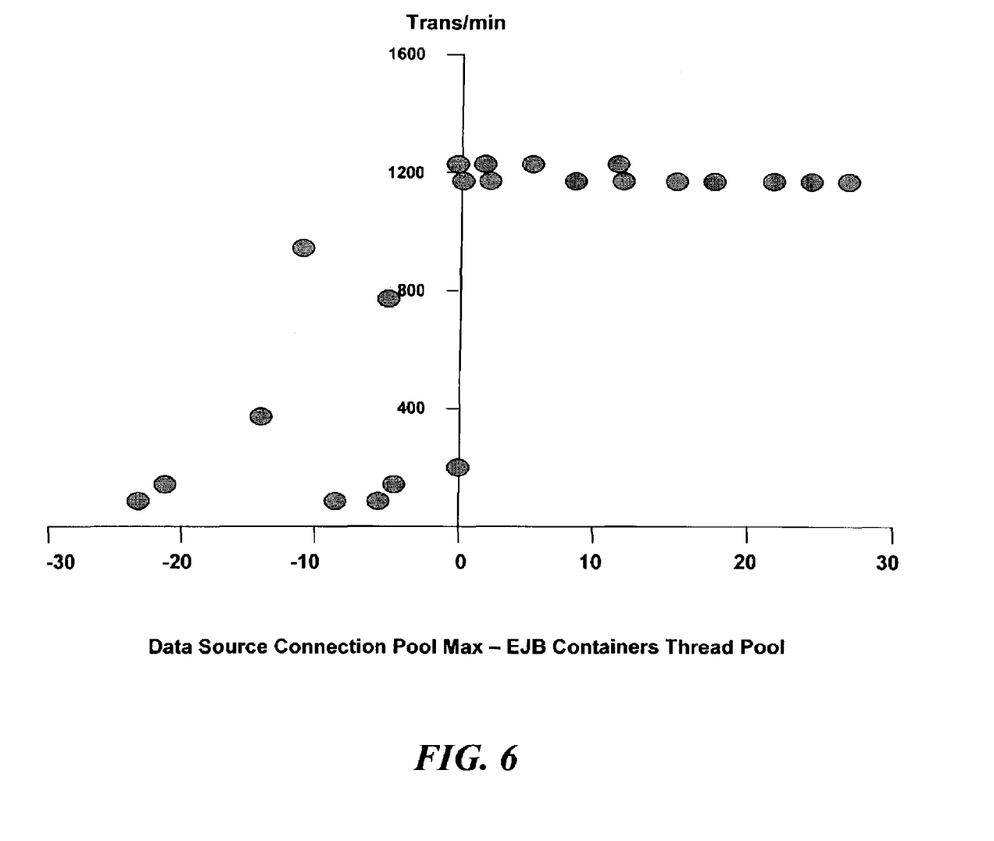
FIG. 6 shows a graph with throughput plotted as a function of the difference between maximum data source connection pool size and EJB container thread pool size.

An analysis of the data by examining the relationship between pairs of variables and throughput revealed that when the EJB Container Thread Pool Size was set to a value higher than the Data Source Connection Pool Maximum, the system performed poorly. Multiple regression analysis further demonstrated that the other parameters had minimal effect on throughput, therefore a closer look at the correlation between the maximum data source connection pool size and the EJB Container Thread Pool Size is beneficial. FIG. 6 shows a graph with throughput plotted as a function of the difference between maximum data source connection pool size and EJB Container Thread Pool Size. Referring to the graph it is evident that when the Data Source Connection Pool Maximum is greater than the EJB Container Thread Pool Size (the difference is positive), the throughput of the system falls within an acceptable range. When the opposite is true, the system responds poorly. An examination of the system logs reveals that there were a significant number of transaction rollbacks which adversely affected throughput. The cause of this behavior is the manner in which this application accesses the database 150. Using the information about the relationship between the EJB Container Thread Pool Size and the Data Source Connection Pool Maximum derived from the method and an examination of the system logs, one could deduce that this application illustrates how an application/database interaction influences an application server configuration. Under certain circumstances, a component of the application requires more than one connection to the database 150. Under load, a situation arises where each thread executing in the EJB Container Pool has grabbed one connection and is waiting to obtain another. If there are fewer connections than threads then no progress can be made. Eventually, the threads time out waiting for connections and roll back their transactions. On receiving notification of the rollbacks, the application attempts to restart the transactions, leading to the same situation again. No progress is made, therefore the impact on throughput is severe.

Further experiments reveal that increasing the Data Source Connection Pool Size Maximum so that it is greater than the EJB Container Thread Pool Size solves the problem. As mentioned earlier, this is a situation where following best practice guides would have led to the opposite conclusion. This is because the accepted notion in tuning application servers is to constrain resources as one gets further away from the client. In other words, to have more Web container threads than EJB container threads and more EJB container threads than data source connections. In this particular application, this rule is inappropriate because the number of connections required by the threads can be greater than the number of threads. When such a situation arises, there can be two solutions—increase the number of data connections, or modify the application so that each thread uses at the most one connection.

Figure 7:
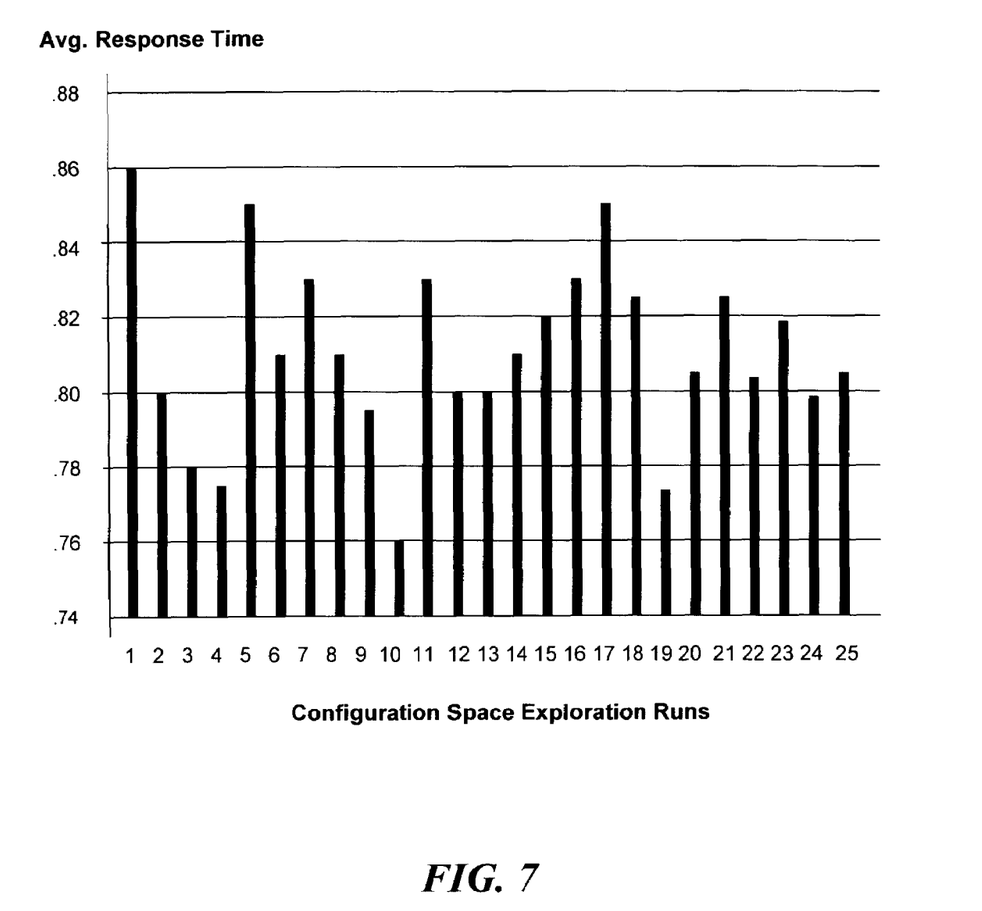
FIG. 7 shows a bar chart of the average response time for each of the twenty-five configuration space exploration runs.

In another case study the conditions are similar to those of the previous case study, except that the operational environment is a stock brokerage firm. FIG. 7 shows a bar chart of the average response time for each of the 25 configuration space exploration runs. Each application run is shown along the horizontal axis, numbered one through twenty-five. The average response time is graphed along the vertical axis. The difference between the maximum and minimum average response times was only fourteen percent in this case. Through the use of statistical means, a correlation between values which highlights the strength of the relationship between those values, is derived by correlating each of the nine parameters with average response time. To find the correlation coefficient, take each configuration parameter and record the 25 values (for each of the 25 test runs). Pair each value for each configuration parameter with the average response time obtained with the parameter set at those values. A correlation coefficient is derived which correlates the strength of the relationship between a parameter value and average response time, positive and negative. The strongest correlations are expressed as the higher numbers (either positive or negative). Table 3 shows the correlation coefficients between each of the nine parameter values and average response time:

TABLE 3

| Parameter | Correlation |
| --- | --- |
| Web Container Thread Pool Minimum | −.10 |
| Web Container Thread Pool Maximum | .68 |
| EJB Container Thread Pool Size | .13 |
| Data Source Connection Pool Maximum | .20 |
| Data Source Connection Pool Minimum | .31 |
| Statement Cache | −.56 |
| JVM Minimum Heap Size | −.22 |
| JVM Maximum Heap Size | −.08 |

From Table 3 we see that the highest correlation coefficient values are associated with Web Container Thread Pool Maximum (0.68) and Statement Cache (−0.56). The higher the value of the number, the greater the correlation between that parameter value and a recorded outcome. The sign of the number indicates the relationship (either positive or negative) between that parameter value and average response time. The positive correlation for Web Container Thread Pool Maximum and average response time indicates that increasing the number of Web container threads will increase response time, therefore the parameter value for Web Container Thread Pool Maximum should be decreased in order to improve response time. Conversely, the negative correlation between Statement Cache and average response time indicates that this parameter value should be raised. In this example, focusing further testing on the two parameters, Web Container Thread Pool Maximum and Statement Cache, is warranted.

Figure 8:
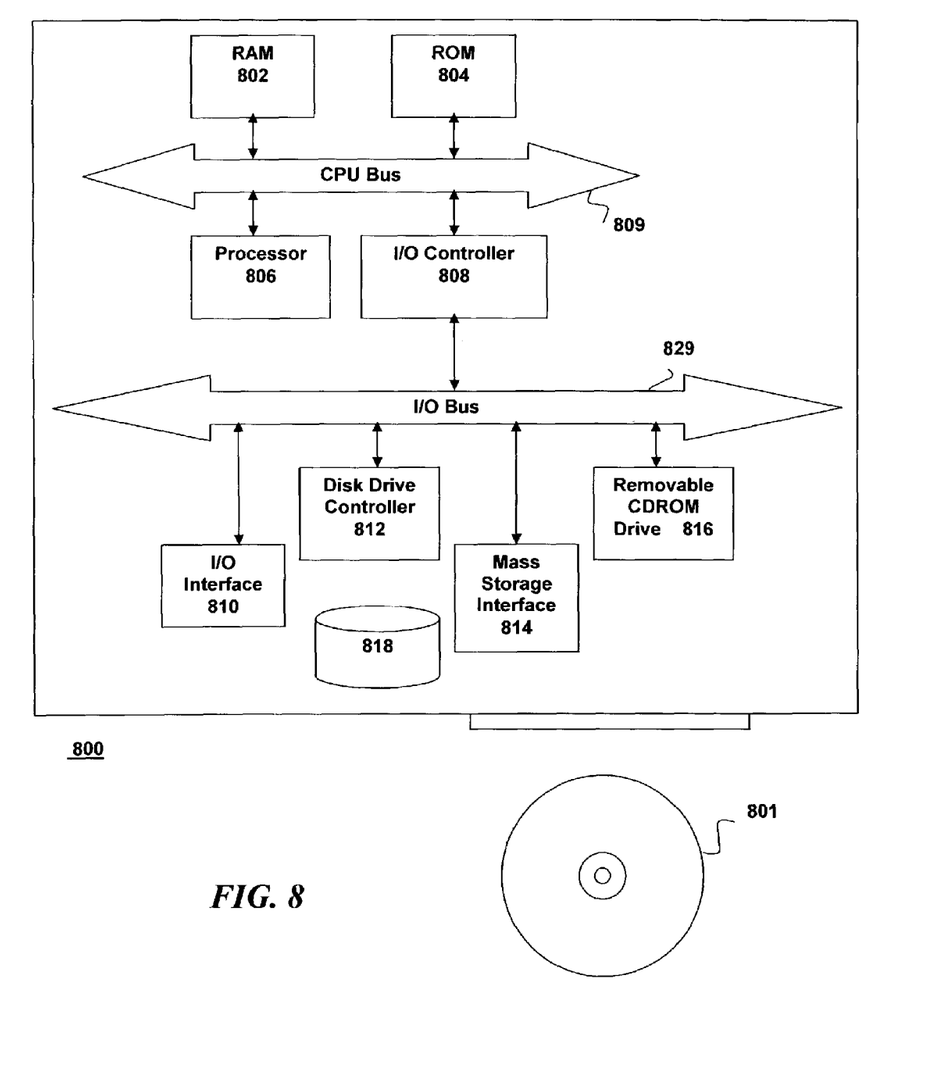
FIG. 8 is a simplified block diagram of a computer program product on which an embodiment of the invention can be advantageously used.

FIG. 8 is a simplified block diagram of a programmable computer including logic that can be configured to operate according to an embodiment of the invention. The logic can be embodied either as software for the programmable computer or an application specific integrated circuit (ASIC) within the computer. According to an embodiment of the invention, a computer readable medium, such as a CDROM 801 can include program instructions for operating the programmable computer 800 according to the invention. The processing apparatus of the programmable computer 800 comprises: random access memory 802, read-only memory 804, a processor 806 and input/output controller 808. These are linked by a CPU bus 809. Additionally, there is an input/output bus 829, and input/output interface 810, a disk drive controller 812, a mass storage device 820, a mass storage interface 814, and a removable CDROM drive 816. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be preferred embodiments, it will be understood by those skilled in the art that other modifications can be made within the spirit of the invention.

We claim:

1. A computer-implemented method for setting configuration parameters for at least one software system, comprising steps of: a) receiving a set of configuration parameters for at least one software system to be optimized; b) selecting a random value from a predetermined range for each configuration parameter of interest; c) setting each configuration parameter to a corresponding random value; d) running an application using the values selected; e) gathering performance information relating to the software system while the application is running; f) repeating steps b) through e) for a selected number of times; and g) performing an analysis of the performance information gathered to determine optimal configuration parameters.

2. The method of claim 1, wherein step b) further comprises selecting a range of configuration parameters before selecting a random value.

3. The method of claim 2, wherein step b) further comprises performing consistency checks when selecting a range of configuration parameters.

4. The method of claim 1 wherein the application server comprises a Java Virtual Machine and step b) comprises selecting a range of 256–512 megabytes for a heap max value.

5. The method of claim 1 wherein step d) comprises running a workload against an application server and step e) comprises measuring performance characteristics of the application server.

6. The method of claim 5 wherein step e) comprises measuring the response time of the software system.

7. The method of claim 5 wherein step e) comprises measuring the throughput of the software system.

8. The method of claim 5 wherein step e) comprises measuring the execution speed of the software system.

9. The method of claim 1 further comprising using multiple regression tests to derive performance information from running the application.

10. The method of claim 1 further comprising using functional testing to derive performance information from running the application.

11. The method of claim 1 further comprising presenting a recommendation to a user of how to adjust parameters.

12. The method of claim 1 wherein step g) comprises deriving a correlation coefficient between each configuration parameter and average response time of the software system.

13. The method of claim 12 wherein step g) further comprises adjusting the configuration parameter inversely to the derived correlation coefficient pertaining to the configuration parameter.

14. The method of claim 11 further comprising presenting the user a recommendation of running additional non-random tests to determine optimal configuration parameters.

15. The method of claim 11 further comprising debugging the program based on results of the testing.

16. The method of claim 1 wherein step g) comprises performing a statistical analysis.

17. A computing system for determining optimal configuration parameters for a software system, the computing system comprising: a first computing apparatus comprising: a processor for running at least one application; an input for receiving an identification of a set of configuration parameters to be optimized and for receiving a predetermined range of values for each configuration parameter of interest; logic for assigning a random value to each configuration parameter from the predetermined range; logic for running the at least one application using the values selected; logic for gathering performance information relating to the software system while the application is running; wherein the logic for assigning a random value, the logic for running an application and the logic for gathering performance information are configured to perform their respective processes for a selected number of times; and logic for performing a statistical analysis of the performance information gathered to determine optimal configuration parameters.

18. The system of claim 17 wherein the at least one application comprises a database application run on a second computing apparatus that is separate from the first computing apparatus.

19. The system of claim 17 wherein the logic for performing a statistical analysis of the performance information is implemented on a second computing apparatus that is separate from the first computing apparatus.

20. A computer readable medium comprising program instructions for:
  a) receiving an identification of a set of configuration parameters for at least one software system to be optimized; b) selecting a random value from a predetermined range for each configuration parameter of interest; c) setting each configuration parameter to a corresponding random value selected; d) running an application using the values selected; e) gathering performance information relating to the software system while the application is running; t) repeating steps b) through e) for a selected number of times; and g) performing an analysis of the performance information gathered to determine optimal configuration parameters.

* * * * *